United States Patent
Knight

(10) Patent No.: US 6,682,459 B1
(45) Date of Patent: Jan. 27, 2004

(54) ELECTRONIC AIR CHARGE CONTROLLER FOR VEHICULAR COMPRESSED AIR SYSTEM

(75) Inventor: David J. Knight, Avon Lake, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 09/635,184

(22) Filed: Aug. 8, 2000

(51) Int. Cl.$^7$ .......................... B60K 41/20; B60T 13/00
(52) U.S. Cl. .......................... 477/183; 96/109; 417/34; 303/60
(58) Field of Search .................. 477/92, 183; 303/1, 303/7, 86, 60; 96/109; 34/80; 417/34, 280

(56) References Cited

U.S. PATENT DOCUMENTS

| | | | | |
|---|---|---|---|---|
| 4,444,168 A | * | 4/1984 | Matsumura et al. | 123/179.18 |
| 4,549,888 A | * | 10/1985 | Fannin | 96/113 |
| 4,763,959 A | * | 8/1988 | Vandemotter | 303/9 |
| 4,877,294 A | * | 10/1989 | Kuhn et al. | 303/9 |
| 4,900,098 A | * | 2/1990 | Kuhn et al. | 303/1 |
| 4,976,589 A | * | 12/1990 | Ide | 417/34 |
| 5,027,529 A | * | 7/1991 | Cramer et al. | 34/53 |
| 5,533,866 A | | 7/1996 | Malecha | |
| 5,592,754 A | * | 1/1997 | Krieder et al. | 34/527 |
| 5,906,480 A | * | 5/1999 | Sabelström | 417/364 |
| 6,036,449 A | * | 3/2000 | Nishar et al. | 417/292 |
| 6,062,652 A | * | 5/2000 | Eberling | 303/7 |

FOREIGN PATENT DOCUMENTS

| | | |
|---|---|---|
| DE | 195 15 895 | 10/1996 |
| EP | 0 831 383 A1 | 3/1998 |
| WO | WO 00/74990 | 6/2000 |

OTHER PUBLICATIONS

International Search Report dated Dec. 10, 2001.

* cited by examiner

Primary Examiner—Ankur Parekh

(57) ABSTRACT

An electronic air charge controller for a tractor trailer vehicle air brake system includes a micro controller, a first pressure sensor interface coupled to the micro controller, a second pressure sensor interface coupled to the micro controller, and a vehicle control protocol interface coupled to the micro controller. The micro controller, in response to a signal received from the first pressure sensor interface indicative of an air supply recharge condition, a signal received from the second pressure sensor indicative of parking brake engagement condition, and a signal from the vehicle control protocol interface indicative of an engine start condition, supplies a maximum engine speed control signal to the vehicle control protocol interface. The time required to charge the air supply system to the required normal operating level is thereby minimized. In addition, a transmission sensor interface is preferably coupled to the micro controller. The micro controller does not generate the maximum engine speed control signal unless a signal supplied by the transmission sensor interface indicates that an automatic transmission is in park or a manual transmission is in neutral. Still further, to improve operating efficiency, a vehicle load condition signal is supplied by the vehicle control protocol interface to the micro controller. In response, the micro controller supplies a pause air compressor charging cycle signal or a pause air dryer recycle signal to the vehicle control protocol interface, if either the air compressor or air dryer is operating when a high load condition is encountered.

24 Claims, 2 Drawing Sheets

ELECTRONIC AIR CHARGE CONTROLLER FOR VEHICULAR COMPRESSED AIR SYSTEM

FIELD OF THE INVENTION

This invention relates in general to the electronic control of a compressed air brake charging system for a tractor trailer vehicle. More specifically, the invention provides a controller which optimizes vehicle performance during system charging and air dryer regeneration cycles.

BACKGROUND OF THE INVENTION

Air brake systems for tractor trailer vehicles are well known in the art. In a conventional system, the basic components include an air compressor with a governor valve, an air dryer, a supply reservoir tank, air brake control valves, wheel mounted brake chambers, and wheel mounted brakes. In an air brake system, the compressor furnishes the compressed air for brake operation by taking free atmospheric air and compressing it to 100–120 psi. The compressed air passes from the compressor into the reservoir where it is stored until it is needed. The compressed air is held in the reservoir until it is released by the operator via the air brake control valves. When the operator utilizes the air brake control valves, air flows to the brake chambers where its energy is transformed into the mechanical force and motion necessary to apply the brakes.

As the complexity of conventional air brake systems has increased, so has the need for a clean air supply. The potential contaminants that collect in the air brake system consist of water condensed from the atmospheric air supply and a small amount of oil from the air compressor. These contaminants pass into the system in both liquid and vapor form because of the heat generated during compression. Keeping these contaminants out of the brake system is imperative to prevent failures due to brake system valve stoppage or brake line blockage due to frozen water. The purpose of the air dryer is to purify and dry the air which is outlet by the air compressor. In a conventional system, compressed air flows through the air dryer while the compressor is running. The air dryer contains absorbent desiccant material which becomes saturated during use. Therefore, the desiccant must be periodically recycled by heating or other means to expel accumulated water vapor.

Conventional air brake systems require periodic recharging of the air supply reservoir. Under normal operating conditions the air compressor control system has a low limit pressure of about 100 psi and a high limit pressure of about 120 psi. When the pressure in the supply reservoir tank drops below 100 psi the system turns the air compressor on and opens the governor valve. When the pressure in the supply reservoir tank reaches 120 psi the system turns the air compressor off and closes the governor valve. Once the air compressor is turned off the air dryer recycles itself by purging the desiccant bed.

An undesirable condition arises when the vehicle is under maximum operating load and it is simultaneously charging the system or regenerating the air dryer. In this case, some of the engine's power will be diverted from powering the wheels to powering the air compressor. This is not desirable under a maximum load situation, because a heavily loaded vehicle's ability to accelerate or climb a long grade would be diminished. In addition, when a vehicle is first started in the morning if the air pressure in the air brake system is low, and the mechanical spring parking brake is engaged, then the vehicle cannot move until the air system develops enough force to disengage the spring. Thus, the operator must wait for a considerable time while the system is brought up to operating pressure before he may move his vehicle.

It is therefore and object of the present invention to provide a system to coordinate air brake system charging cycles with periods of non peak engine performance requirements, and to shorten the charging time for the system upon vehicle start up.

SUMMARY OF THE INVENTION

The present invention provides an electronic air charge controller for a tractor trailer vehicle air brake system. The electronic air charge controller includes a micro controller, a first pressure sensor interface coupled to the micro controller, a second pressure sensor interface coupled to the micro controller, and a vehicle control protocol interface coupled to the micro controller. The micro controller, in response to a signal received from the first pressure sensor interface indicative of an air supply recharge condition, a signal received from the second pressure sensor indicative of parking brake engagement condition, and a signal from the vehicle control protocol interface indicative of an engine start condition, supplies a maximum engine speed control signal to the vehicle control protocol interface. The time required to charge the air supply system to the required normal operating level is thereby minimized.

In addition, a transmission sensor interface is preferably coupled to the micro controller. The micro controller does not generate the maximum engine speed control signal unless a signal supplied by the transmission sensor interface indicates that an automatic transmission is in park or a manual transmission is in neutral. An added measure of safety is provided by preventing the engine speed from going to maximum unless the transmission is in a position that impedes vehicle movement.

Still further, to improve operating efficiency, a vehicle load condition signal is supplied by the vehicle control protocol interface to the micro controller. In response, the micro controller supplies a pause air compressor charging cycle signal or a pause air dryer recycle signal to the vehicle control protocol interface, if either the air compressor or air dryer is operating when a high load condition is encountered.

Other advantages and features of the invention will become apparent from the following detailed description of the preferred embodiments and the accompanying drawings.

BRIEF DESCRIPTION OF THE DRAWINGS

The invention will now be described with reference to certain preferred embodiments thereof and the accompanying drawings, wherein.

DETAILED DESCRIPTION OF THE PREFERRED EMBODIMENT

Figure 1:
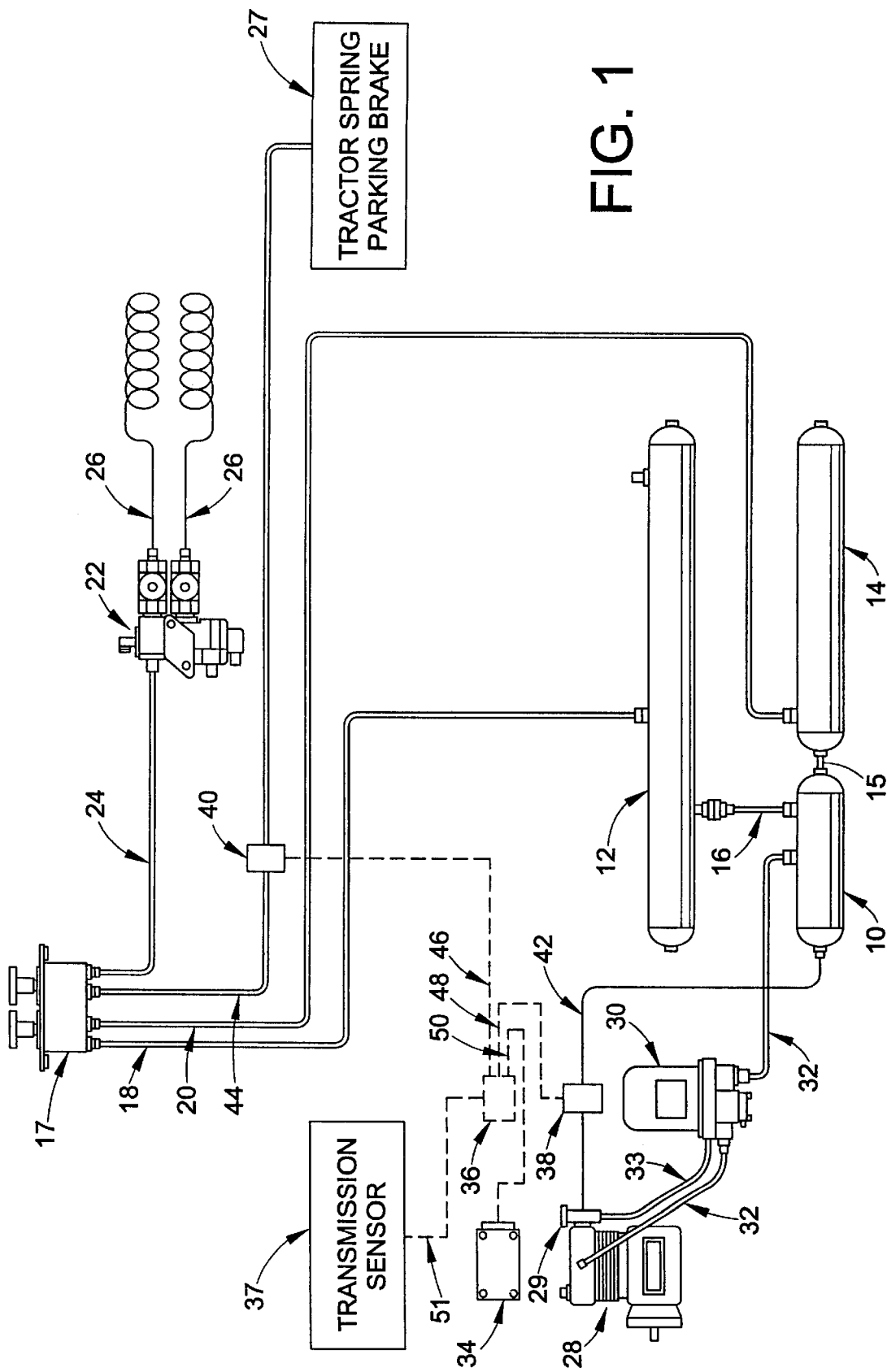
FIG. 1 is a schematic diagram of a compressed air supply system including an electronic air charge controller in accordance with the present invention.

FIG. 1 illustrates a tractor trailer vehicle brake compressed air supply system in accordance with a preferred embodiment of the invention. The compressed air supply system preferably includes three compressed air tanks, a supply reservoir tank 10, a primary service tank 12, and a secondary service tank 14. The supply reservoir tank 10 and the primary service tank 12 are connected by an air line 15 with a check valve (not shown), and the supply reservoir tank 10 and the secondary service tank 14 are connected by an air line 16 with a check valve. The primary service tank 12 and the secondary service tank 14 are connected to a park control valve 17 respectively via air lines 18–20. The park control valve 17 is connected to a tractor protection valve 22 via an air line 24, and the tractor protection valve 22 is coupled directly to the trailer brake controls 26. In addition, the park control valve 17 is connected to the tractor spring parking brake 27 via an air line 44. An air compressor 28 with a governor valve 29 and an air dryer 30 are coupled to the secondary service tank via an air line 32 and the governor valve 29 is attached to the air dryer via an air line 33.

The compressed air supply system includes the following control devices: a vehicle control unit 34, an electronic air charge controller (EAC) 36, a transmission sensor 37, a first pressure sensor 38, and a second pressure sensor 40. The first pressure sensor 38 measures the pressure within an air line 42 that couples the governor valve 29 to the supply reservoir 10, which is indicative of the air pressure within the supply reservoir 10. The second pressure sensor 40 measures the pressure within an air line 44 which is routed from the tractor spring parking brake 27 to the park control valve 17, which is indicative of whether the tractor spring parking brake 27 is engaged. The transmission sensor 37 supplies a signal indicative of whether an automatic transmission is in park or whether a manual transmission is in neutral. The first pressure sensor 38, the second pressure sensor 40, and the transmission sensor 37 are connected to the electronic air charge controller 36 via respective control lines 46, 48, 51. The electronic air charge controller 36 is connected to the vehicle control unit 34 via control line 50. The vehicle control unit 34 supplies signals indicative of engine and vehicle operation (for example engine load conditions and whether the air compressor 28 or air dryer 30 are operating) to the electronic air charge controller 36, as well as receive signals from the electronic air charge controller 36 that are used to control engine and vehicle operation.

Figure 2:
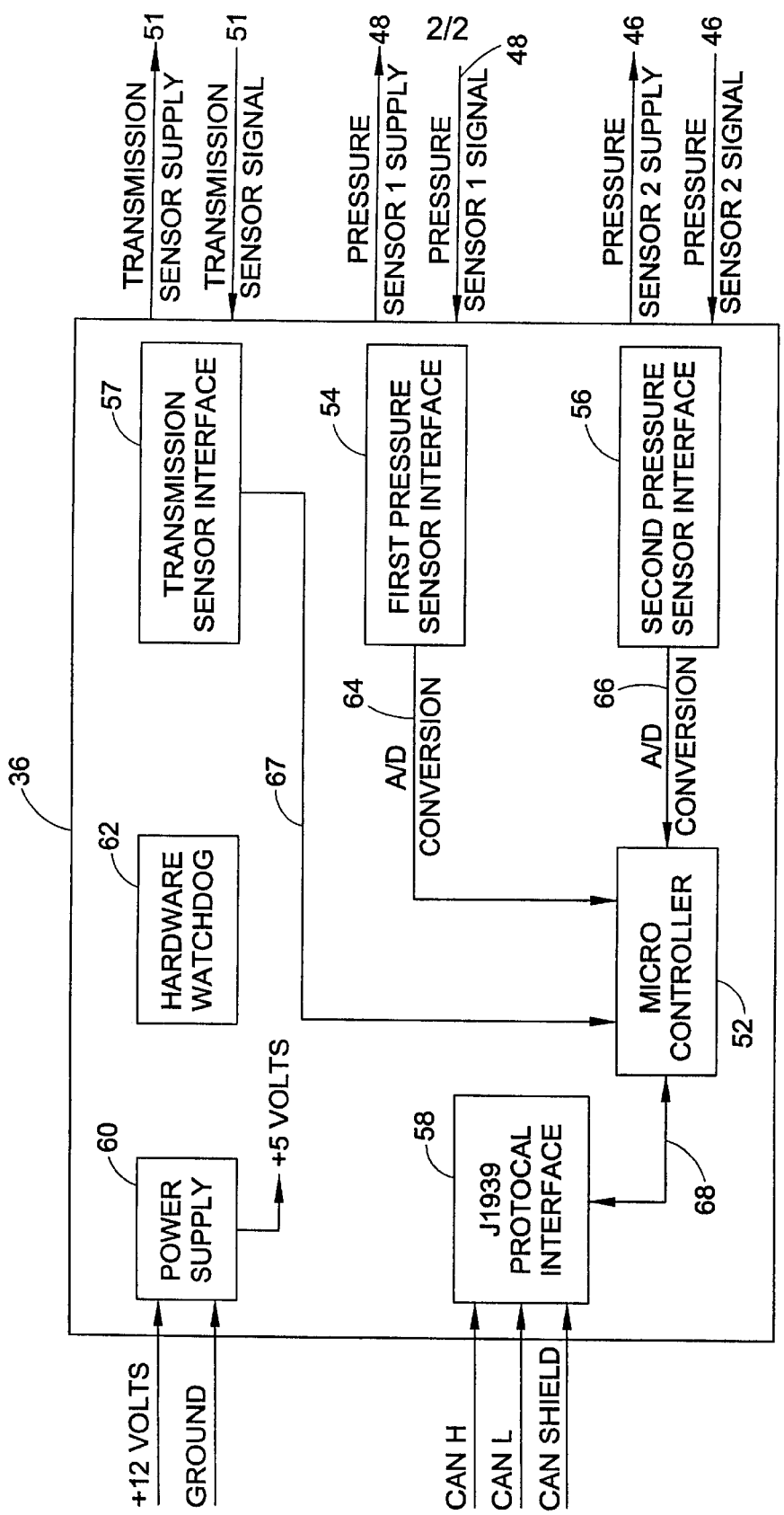
FIG. 2 is a functional block diagram of an electronic air charge controller.

Referring now to FIG. 2, in a preferred embodiment of the invention, the electronic air charge controller 36 includes the following basic components: a micro controller 52, a first pressure sensor interface 54, a second pressure sensor interface 56, a transmission sensor interface 57, a J1939 vehicle control protocol interface 58, a power supply 60, and a hardware monitor or "watchdog" unit 62. The micro controller 52 is connected via interior if control lines 64, 66, 67, and 68 respectively to the first pressure sensor interface 54, the second pressure sensor interface 56, the transmission sensor interface 57, and the J1939 vehicle control protocol interface 58. The first and second pressure sensor interfaces 54–56 are connected respectively via exterior control lines 46–48 to the first and second pressure sensors 38–40. The transmission sensor interface 57 is connected via an exterior control line 51 to the transmission sensor 37. The J1939 vehicle control protocol interface 58 is connected to the vehicle control unit 34 via a control line 50. The power supply 60 steps the 12 V DC vehicle power supply down to preferably 5 V DC for use by the engine air charge control system 36. The hardware watchdog unit 62 provides a constant check upon communications and power supply status within the engine air charge control system 36.

The operation of the compressed air supply system 10 is described as follows. Utilizing the electronic air charge controller 36, the present invention adds intelligence to the above referenced conventional air brake system charging control scenario to optimize vehicle performance. The electronic air charge controller 36 receives input information from the first pressure sensor 38, the second pressure sensor 40, and the transmission sensor 37 via the respective interfaces. The first pressure sensor 38 indicates the pressure in the supply reservoir 10, and the EAC 36 uses this information to determine if the pressure is below the low limit pressure (preferably 100 psi) which indicates the system needs to be recharged. The second pressure sensor 40 measures the air pressure in the tractor parking brake system, and the EAC 36 uses this information to determine if the pressure is low enough to engage the spring parking brakes 26, 27. The transmission sensor 37 indicates whether or not a manual transmission is in neutral or an automatic transmission is in park, and it sends a signal regarding the status of the transmission to the EAC 36.

Upon vehicle startup, if the pressure in the air brake system is low, the spring loaded vehicle parking brakes are held shut by a stiff mechanical spring. The vehicle cannot move until the system reaches operating pressure and releases the spring parking brake. When the electronic air charge controller 36 senses that the vehicle is in start up condition, the spring parking brakes are engaged, and the air supply reservoir needs to be recharged based on the signals received from the air pressure sensors 38, 40 and vehicle control unit 34 via the corresponding interfaces, it sends a signal to the vehicle control unit 34 to set the engine at maximum engine speed. Maximum engine speed is preferably 1,800 rpm, which is considerably faster than typical fast idle speeds of about 900 rpm.

In order to prevent accidents from occurring due to vehicle movement, the ECU 36 preferably utilizes a signal supplied from the transmission sensor 37 via the transmission sensor interface 57 to verify that the transmission is in neutral—if a manual transmission is employed—or in park—if an automatic transmission is employed—prior to setting the engine at maximum engine speed. Thus, the EAC 36 will not increase the engine speed unless the vehicle is safely engaged in neutral or park.

Maximum engine speed is maintained until the electronic air charge controller 36 senses that the air pressure in the supply reservoir tank 10 has reached the high limit pressure of preferably 120 psi. In this manner, the system reaches its operating air pressure as fast as possible, and the delay upon start up is minimized.

In another preferred embodiment, the electronic air charge controller 36 monitors signals supplied by the vehicle control unit 34 via the vehicle control protocol interface 58 to detect a period of peak engine demand. During peak engine demand, if the air compressor 28 is pressurizing the compressed air supply system 10, the electronic air charge controller 36 will supply a pause signal to temporarily shut the air compressor 28 off or pause the charging of the system until the period of peak engine demand has ceased. In addition, during a period of peak engine demand, if the air dryer 30 is being recycled, the electronic air charge controller 36 supplies a pause signal to pause the recycling of the air dryer 30 until the end of the peak period.

The invention has been described with reference to certain preferred embodiments thereof. It will be understood, however, that modification and variations are possible within the scope of the appended claims. For example, it will be readily understood by those of ordinary skill in the art that the micro-controller of the electronic air charge controller can be implemented using a programmable microprocessor, discrete hardware components, application specific integrated circuits or any other equivalent devices that provide the required functions to be performed. Further, the interfaces utilized to couple the micro controller to the various sensors and vehicle control unit can simply be utilized to provide the appropriate connection or can also provide any appropriate signal conditioning that may be necessary. Still further, while it is preferable that micro controller not increase engine speed unless an automatic transmission is in park, the same criteria can be used for both automatic and manual transmission, namely, that the transmission be in neutral.

What is claimed is:

1. An electronic air charge controller comprising:
   a micro controller;
   a first pressure sensor interface coupled to the micro controller;
   a second pressure sensor interface coupled to the micro controller; and
   a vehicle control protocol interface coupled to the micro controller;
   wherein the micro controller, in response to a signal received from the first pressure sensor interface indicative of an air supply recharge condition, a signal received from the second pressure sensor indicative of parking brake engagement condition, and a signal from the vehicle control protocol interface indicative of an engine start condition, generates a maximum engine speed control signal.

2. The electronic air charge controller claimed in claim 1, further comprising a transmission sensor interface coupled to the micro controller, wherein the micro controller does not generate the maximum engine speed control signal unless a signal supplied by the transmission sensor interface is indicative of a transmission park condition.

3. The electronic air charge controller claimed in claim 1, further comprising a transmission sensor interface coupled to the micro controller, wherein the micro controller does not generate the maximum engine speed control signal unless a signal supplied by the transmission sensor interface is indicative of a transmission neutral condition.

4. The electronic air charge controller claimed in claim 1, wherein the micro controller, in response to a vehicle load condition signal supplied by the vehicle control protocol interface, generates a pause air compressor charging cycle signal.

5. The electronic air controller claimed in claim 1, wherein the micro controller, in response to a vehicle load condition signal supplied by the vehicle control protocol interface, generates a pause air dryer recycle signal.

6. An electronic air charge controller comprising:
   a micro controller; and
   a vehicle control protocol interface coupled to the micro controller;
   wherein the micro controller, in response to a vehicle load condition signal supplied by the vehicle control protocol interface, generates a pause air dryer recycle signal.

7. An electronic control circuit comprising:
   a micro controller; and
   a vehicle control unit communicating with the micro controller;
   wherein the micro controller, in response to a vehicle load condition signal supplied by the vehicle control unit, generates a pause air compressor charging signal.

8. A method of controlling a compressed air system charging cycle comprising:
   sensing an engine's operating load requirements; and
   charging the compressed air system to optimize engine performance by pausing charging as a function of the load requirements regardless of a pressure in an air reservoir charged by the compressed air system.

9. A method of controlling a compressed air system charging cycle comprising:
   sensing an engine's operating load requirements;
   sensing whether or not an air dryer requires recycling; and
   scheduling the recycling of the air dryer to optimize engine performance by pausing recycling during periods of peak engine operating load.

10. A method of controlling a compressed air system charging cycle comprising:
    sensing whether a parking brake is engaged;
    sensing whether a compressed air system requires charging; and
    increasing an engine idle speed to a maximum engine speed if the parking brake is engaged and the compressed air system requires charging.

11. The method claimed in claim 10 further comprising:
    sensing whether a transmission is in park; and
    increasing the engine idle speed to a maximum engine speed only if the transmission is in park.

12. The method claimed in claim 10 further comprising:
    sensing whether a transmission is in neutral; and
    increasing the engine idle speed to a maximum engine speed only if the transmission is in neutral.

13. An apparatus comprising:
    means for sensing an engine's operating load requirements;
    means for sensing whether a compressed air system requires charging; and
    means for scheduling the charging of the compressed air system to optimize engine performance by pausing charging during periods of peak engine operating load.

14. An apparatus comprising:
    means for sensing an engine's operating load requirements;
    means for sensing whether or not an air dryer requires recycling; and
    means for scheduling the recycling of the air dryer to optimize engine performance by pausing recycling during periods of peak engine operating load.

15. An apparatus comprising:
    means for sensing whether a parking brake is engaged;
    means for sensing whether a compressed air system requires charging; and
    means for increasing an engine idle speed to a maximum engine speed if the parking brake is engaged and the compressed air system requires charging.

16. An apparatus as claimed in claim 15 further comprising:
    means for sensing whether a transmission is in park; and
    means for increasing the engine idle speed to maximum engine speed only if the transmission is in park.

17. An apparatus as claimed in claim 15 further comprising:
    means for sensing whether a transmission is in neutral; and
    means for increasing the engine idle speed to maximum engine speed only if the transmission is in neutral.

18. An electronic air charge control circuit, comprising:

a controlling circuitry;

a sensor transmitting a signal, indicating at least one of a pressure in a reservoir and an engagement of a brake, to the controlling circuitry; and a vehicle control communicating with the controlling circuitry, an engine speed control signal being generated by the controlling circuitry as a function of the signal received from the sensor and a signal received from the vehicle control indicating a start condition of an engine.

19. The electronic air charge controller as set forth in claim 18, further including:

a second sensor transmitting a signal to the controlling circuitry, the speed control signal also being generated as a function of the signal received from the second sensor.

20. The electronic air charge controller as set forth in claim 19, wherein the signal received from the second sensor indicates at least one of a pressure in the reservoir and the engagement of the brake.

21. A method of controlling a compressed air system charging cycle comprising:

sensing whether a brake within a vehicle is engaged;

sensing whether a compressed air system requires charging; and setting an engine idle speed as a function of whether the brake is engaged and the compressed air system requires charging.

22. An apparatus comprising:

means for sensing whether a vehicle brake is engaged;

means for sensing whether a compressed air system requires charging; and means for setting an engine idle speed as a function of the brake being engaged and the compressed air system being charged.

23. An apparatus comprising:

a sensor sensing whether a vehicle brake is engaged;

a sensor sensing whether a compressed air system requires charging; and control circuitry for setting an engine idle speed as a function of the brake being engaged and the compressed air system being charged.

24. An air charge control circuit, comprising:

a vehicle control unit generating a signal corresponding to a predetermined vehicle load condition; and a control circuit that receives said predetermined vehicle load condition signal and generates a signal to pause charging of a compressed air system, regardless of a pressure in an air reservoir charged by the compressed air system, until said predetermined vehicle load condition signal stops.

* * * * *